May 24, 1927.
C. CURRY
1,629,655
SAUSAGE MAKING MACHINE
Filed March 22, 1927
3 Sheets-Sheet 1
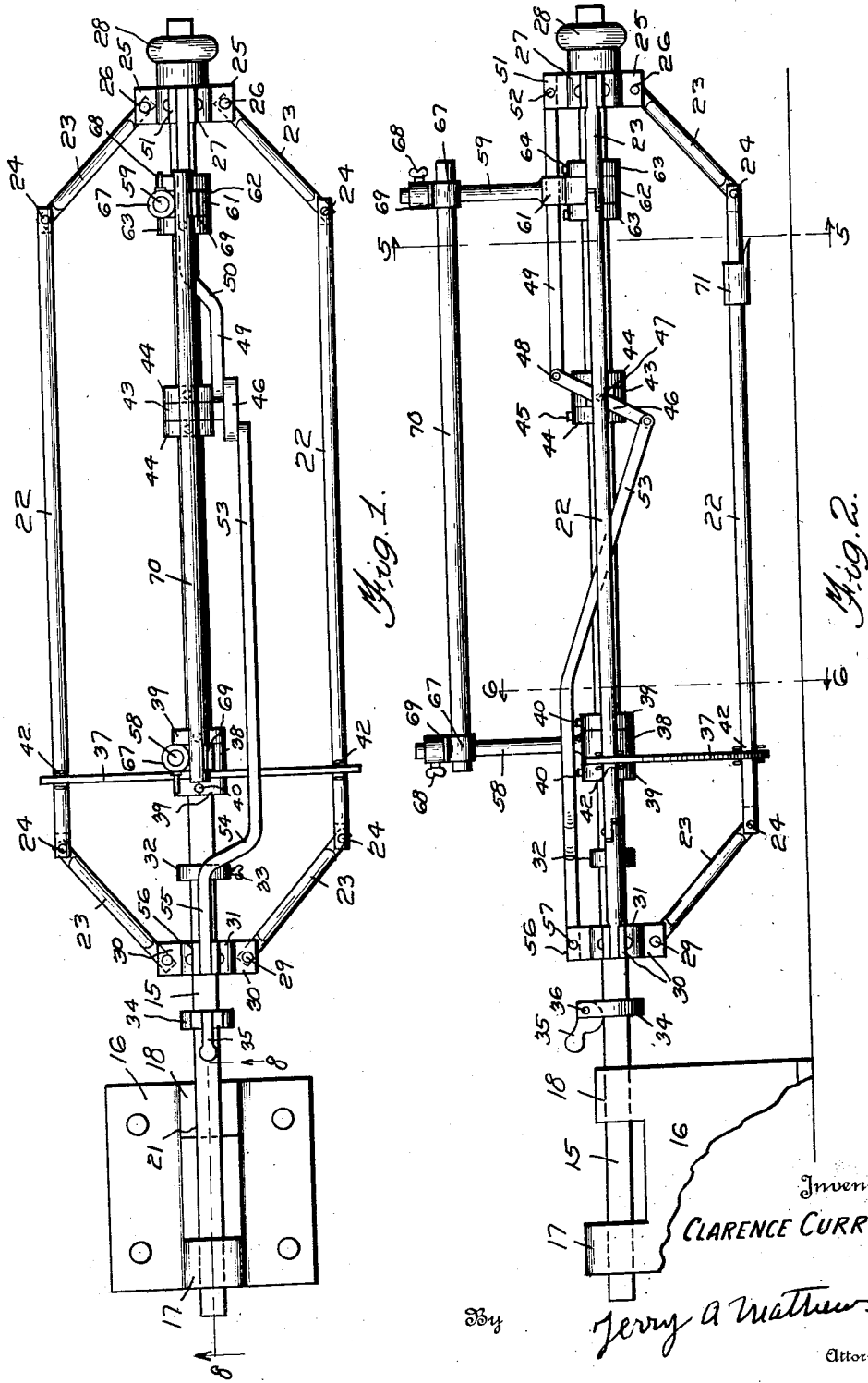
Inventor
CLARENCE CURRY,
By Jerry A Mathews
Attorney

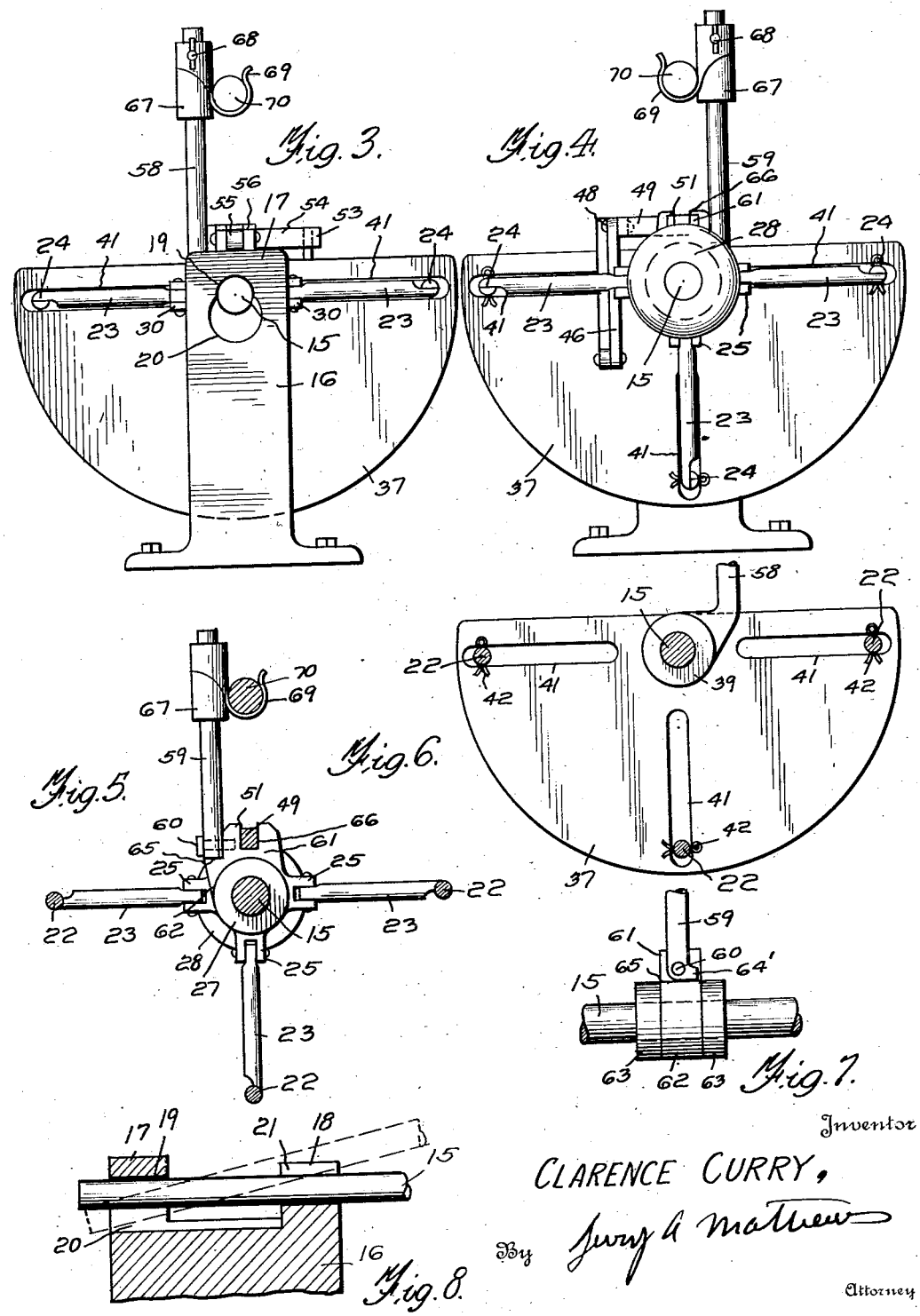

May 24, 1927.
C. CURRY
1,629,655
SAUSAGE MAKING MACHINE
Filed March 22, 1927
3 Sheets-Sheet 3
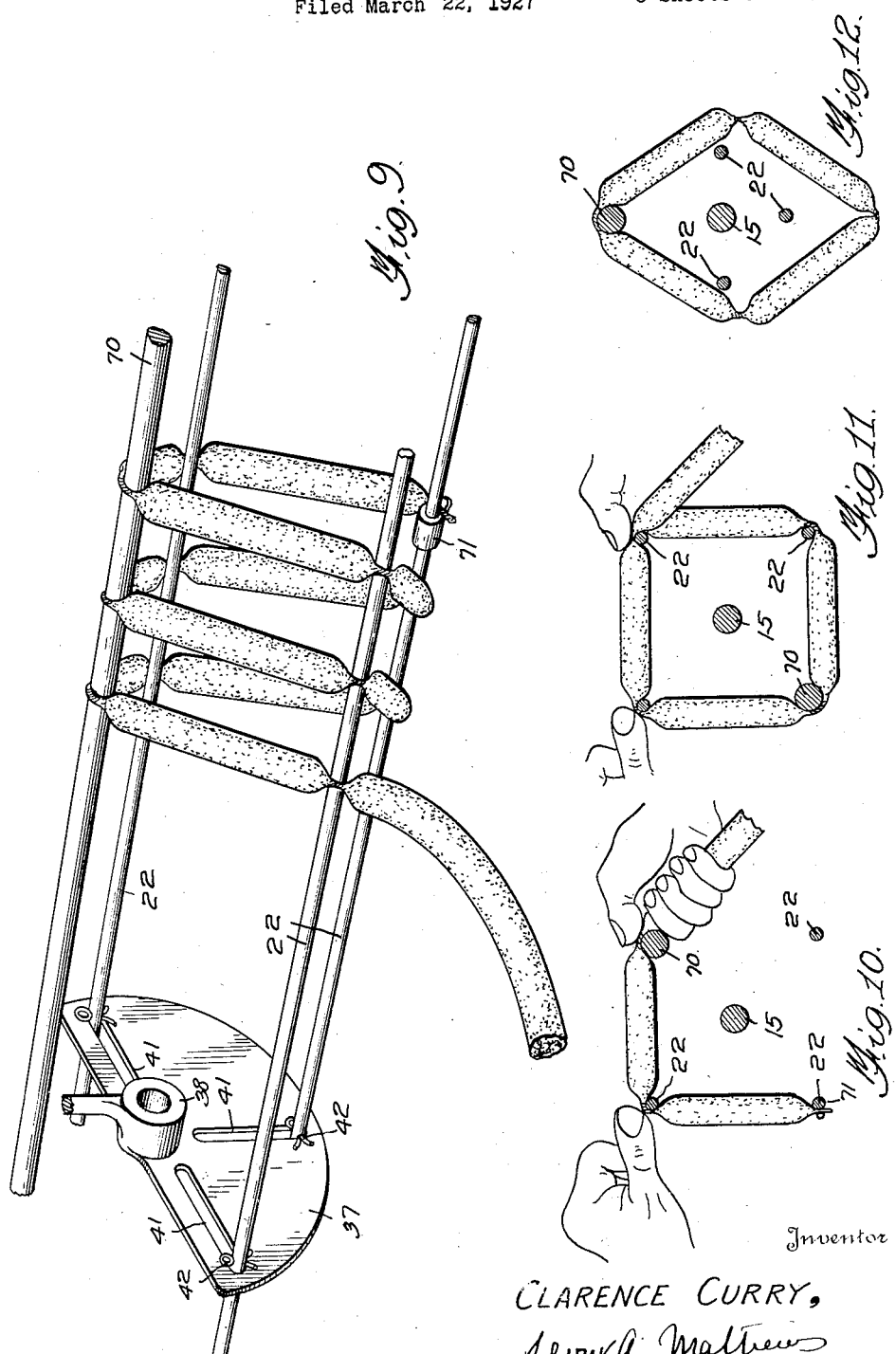
Inventor
CLARENCE CURRY,
By Jerry A. Mathews
Attorney Patented May 24, 1927.

1,629,655

UNITED STATES PATENT OFFICE.

CLARENCE CURRY, OF RICHMOND, VIRGINIA.

SAUSAGE-MAKING MACHINE.

Application filed March 22, 1927. Serial No. 177,386.

My invention relates to a machine for linking and supporting sausages prior to the smoking treatment.

As is well known, the filled sausage casing is ordinarily laid across a measuring block by the operator, and pressed between the thumb and forefinger at each end of the link. The casing is then lifted from the block, compressed slightly and suitably turned for twisting the casing between the links. This operation is continued until the entire casing has been formed in the links. After this the linked sausages are gathered up upon the fingers and draped over the smoke stick. This smoke stick is suspended in a suitable smoke house.

In accordance with my invention, I provide a machine, by the operation of which, all of these functions, previously formed by hand entirely, may be carried out, in a much more reliable manner, and at a great saving in time and labor.

In the accompanying drawings, forming a part of this specification, and in which like numerals are employed to designate like parts throughout the same, Figure 1 is a plan view of a sausage linking machine embodying my invention, Figure 2 is a side elevation of the same, Figure 3 is an elevation of one end of the machine, Figure 4 is an elevation of the opposite end of the machine, Figure 5 is a transverse section taken on line 5—5 of Figure 2, Figure 6 is a similar view taken on line 6—6 of Figure 2, Figure 7 is a fragmentary side elevation of the collapsible smoke stick support or arm, Figure 8 is a longitudinal section taken on line 8—8 of Figure 1, Figure 9 is a perspective view of the reel element embodied in the machine, Figure 10 is a transverse section through the reel element showing the manner of producing the links, Figure 11 is a similar view, showing the reel element turned to the next position, and, Figure 12 is a similar view, showing the reel element collapsed, so that the linked sausages may be removed with the smoke stick.

In the drawings, wherein for the purpose of illustration is shown a preferred embodiment of my invention, the numeral 15 designates a horizontal shaft or rod, carried by a support-block 16. This support-block is provided with upstanding ears 17 and 18. The top of the ear 17 is closed and the same is provided with an upper opening 19, Figure 3, which is circularly curved, and leads into a lower opening 20 of larger diameter, and also is curved. The ear 18 is provided with a recess 21, circularly curved at its bottom and open at its top. As clearly illustrated in Figure 8, one end of the shaft 15 may be quickly and conveniently inserted into the opening 19 and recesses 21 and will be securely supported from one end, in a substantially horizontal position, while its opposite end is free and unsupported.

The machine embodies a radially collapsible and extensible reel element, including preferably three horizontal parallel side rods 22 which are preferably laterally equidistantly spaced. At their opposite ends, these side rods are pivotally connected with links 23, as shown at 24. The links 23, to the right, are radially disposed, and are pivoted within slotted radial knuckles or ears 25, as shown at 26. These knuckles are preferably formed integral with a sliding head or carriage 27, slidably mounted upon the shaft 15. The head 27 is equipped with a knob 28, so that it may be manually shifted. The links 23, to the left, Figure 2, are pivotally mounted, as shown at 29, within slotted radial knuckles 30, integral with a head or carriage 31, slidable upon the shaft 15. The extent of inward sliding movement of the carriage 31 is regulated by a stop collar 32, longitudinally adjustable upon the shaft 15, and clamped thereto by a set screw 33 or the like. Carriage 31 is locked in the inner position, by means of a ring 34, slidable upon the shaft 15, and adapted to be locked thereto by means of a locking cam 35 which is pivoted to the collar 34, as shown at 36.

The numeral 37 designates a generally semi-circular control plate, which is radial with respect to the shaft 15 and preferably integral with a collar 38, which is slidably mounted upon the shaft 15. The collar 38 is held against longitudinal movement upon the shaft by means of stop rings 39, clamped thereto by set screws 40 or the like. The radial control plate 37, is provided with radial slots 41, receiving the side rods 22 therein as more clearly shown in Figure 6. The side rods are provided adjacent to and upon opposite sides of the control plate with transverse openings receiving stop elements, in the form of cotter pins 42 or the like. The control plate functions to prevent the longitudinal movement of the side rods 22 with respect to the shaft 15, but permits of their free radial adjustment. The control plate, with the associated elements, permit of the side rods being radially adjusted, while remaining parallel. Means are provided to cause the carriages 27 and 31 to move in unison, in opposite directions, through the same distance. This means embodies a collar 43, slidably mounted upon the shaft 15, between stop rings 44, clamped to the shaft by set screws 45 or the like. The numeral 46 designates a lever which is pivoted at 47, with the collar 43, and the pivot point 47 is equidistantly spaced from the ends of the lever. The lever 46 assumes a generally upright position and its upper end is pivotally connected, at 48, with a shifting link 49, having parallel end portions which are offset laterally, as shown at 50, in Figure 1. The outer end of the link 49 is arranged within a slotted knuckle 51 and is pivoted thereto, as shown at 52. The lower end of the lever 46 has pivotal connection with the inner end of a shifting link 53, which is bent downwardly, as shown. This link has a laterally offset portion 54, whereby the outer end 55 of the link is straight and is arranged in alinement with the outer end of the link 49. The end 50 is mounted within a slotted knuckle 56, and is pivoted therein as shown at 57. It is thus seen that when the carriage 27 is moved inwardly, that the companion carriage 31 will simultaneously move inwardly for the same distance, and when the carriage 31 is locked against longitudinal movement, the carriage 27 is also held against longitudinal movement.

The numeral 58 designates a radial supporting arm, which is preferably formed integral with the sleeve 38. The numeral 59 designates a companion radial supporting arm, the lower end of which is apertured for the reception of a bolt or pivot element 60, see particularly Figures 5 and 7, and this bolt is secured to the side of an upwardly projecting lug 61, formed integral with a collar 62, which is slidable upon the shaft 15, and held between stop rings 63, clamped thereto by set screws 64 or the like. The support arm 59 is provided at its lower end with a lateral extension 64′, projecting longitudinally of the shaft 15, and adapted to engage with a horizontal shoulder 65. The arrangement is such that the support arm 59 may be swung inwardly or to the left, Figure 2. to assume a substantially horizontal position, but when it is swung outwardly or the right, the extension 64′ will engage the shoulder 65 when the support arm has been shifted to the radial position.

The lug 61 is provided in its top with a recess or groove 66, slidably receiving the outer end of the link 50. This engagement between the link and the lug 61 prevents the collar 62 from turning upon the shaft 15 with relation to the link 49 and other elements of the reel element, and retains the arm 59 in radial alinement with the arm 58.

The arms 59 carry sleeves 67, slidable thereon and adapted to be clamped thereto by set screws 68 or the like. These sleeves carry spring clips 69, adapted for the reception of the smoke stick 70. The arrangement of the arms 58 and 59 is such that the smoke stick is held above and in alinement with the lowermost side rod 22 and the smoke stick is equidistantly spaced from the pair of upper side rods 22. It is thus seen that the side rods 22 and the smoke stick form a reel which is substantially square in cross section.

Slidably mounted upon one side rod 22 is a clamp 71, which may be employed to attach one end of the filled casing to the side rod. The smoke stick 70 may be equipped with a similar clamp, if desired.

The operation of the machine is as follows:

The carriage 27 is shifted longitudinally upon the shaft 15 so that the side rods 22 are adjusted to the selected radial position and the collar 32 may be clamped to the shaft 15 to define this selected adjusted position. The collar 34 is now shifted to the right into engagement with the carriage 31 and clamped to the shaft 15, for holding the carriage 31 against longitudinal movement. The sleeves 67 are now adjusted longitudinally upon the support arms 58 and 59 so that the smoke stick 70 will be spaced from the shaft 15 the same distance as the side rods 22. The end of the filled casing may now be twisted and fastened beneath the clamp 71, and the reel element is turned one step until the casing contacts with the next side rod 22. The casing is now pressed against the side rod by the thumb and forefinger and the casing is suitably turned to produce the twisting of the casing adjacent to the side rod. The reel is turned another step away from the operator and the casing is brought into contact with the side rod and again pressed upon the side rod and twisted, producing the next link in the sausage, as illustrated in Figure 10. The step by step turning movement of the reel is thus continued and the links produced and wound about the reel, Figure 11. When the end of the casing is reached, the reel structure is collapsed, Figure 12, and the smoke stick 70 is removed from the clip 69 to the arm 59 and this arm 59 swung outwardly to the horizontal position. The smoke stick 70, with the links of sausage thereon, may now be removed to the right of the machine, and transferred to the smoke house. A new smoke stick 70 is now positioned in the machine and the operation repeated. The length of the links may be varied by varying the position of the stop collar 39. By the use of the machine, the links may all be formed in the same length, which is highly advantageous.

It is to be understood that the form of my invention, herewith shown and described is to be taken as a preferred example of the same, and that various changes in the shape, size and arrangement of parts may be resorted to without departing from the spirit of my invention, or the scope of the subjoined claims.

Having thus described my invention, I claim:

1. In a sausage linking machine, a support, a reel rotatable upon the support and embodying a smoke stick which is bodily removable from the other elements of the reel.

2. In a sausage making machine, a support, a collapsible reel rotatable upon the support and embodying a smoke stick which is removable from the other elements of the reel.

3. In a machine for making sausage, a rotatable collapsible reel embodying a smoke stick which is removable from the other elements of the reel.

4. In a machine for linking sausages, a support, a plurality of side rods carried by the support, means to move the side rods radially with relation to the support, and a smoke stick carried by the support and removable from said support and side rods.

5. In a machine for linking sausages, a shaft, carriages slidably mounted upon the shaft, side rods arranged about the shaft in spaced relation and extending longitudinally thereof, links connecting the side rods and carriages, means to move the carriages longitudinally upon the shaft and hold them against longitudinal movement in a selected position, a smoke stick extending longitudinally of the shaft, and detachable means connecting the smoke stick with the shaft, said smoke stick and side rods being embodied within a reel structure.

6. In a machine for linking sausages, a shaft, carriages slidably mounted upon the shaft, connecting means between the carriages whereby they move together in opposite directions, side rods extending longitudinally of the shaft, links connecting the side rods and carriages, a smoke stick extending longitudinally of the shaft, and means for detachably supporting the smoke stick from said shaft.

7. In a machine for linking sausages, a shaft, carriages slidably mounted upon the shaft, a collar rotatable upon the shaft, a lever pivoted upon the collar, links pivotally connected with the lever and with the carriages, means to hold one carriage against longitudinal movement, slide rods extending about the shaft in spaced relation and extending longitudinally thereof, links connecting the side rods and carriages, a control plate rotatably mounted upon said shaft and having radial slots receiving the side rods, a radial arm rigidly connected with the control plate, a collar rotatably mounted upon said shaft and having a slot slidably receiving one link connected with said lever, a radial arm connected with the last named collar, and a smoke stick removably mounted upon the radial arms.

In testimony whereof I affix my signature.

CLARENCE CURRY.